April 1, 1958 — C. E. JOHNSON — 2,828,825
POTATO HARVESTER CONVEYORS
Filed Dec. 6, 1954 — 5 Sheets-Sheet 1

INVENTOR.
Carl E. Johnson
BY

April 1, 1958　　　C. E. JOHNSON　　　2,828,825
POTATO HARVESTER CONVEYORS

Filed Dec. 6, 1954　　　　　　　　5 Sheets-Sheet 2

INVENTOR.
Carl E. Johnson
BY
Atty.

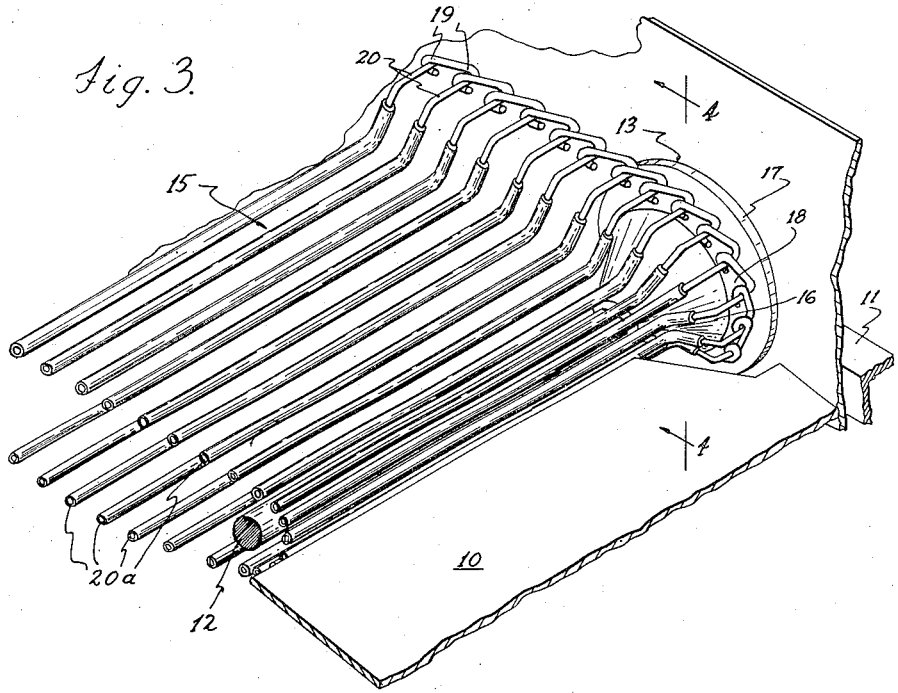
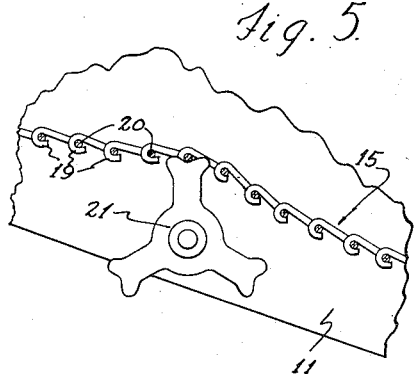
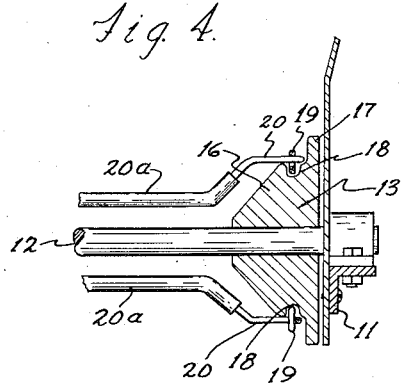
INVENTOR.
Carl E. Johnson

April 1, 1958  C. E. JOHNSON  2,828,825
POTATO HARVESTER CONVEYORS
Filed Dec. 6, 1954  5 Sheets-Sheet 4
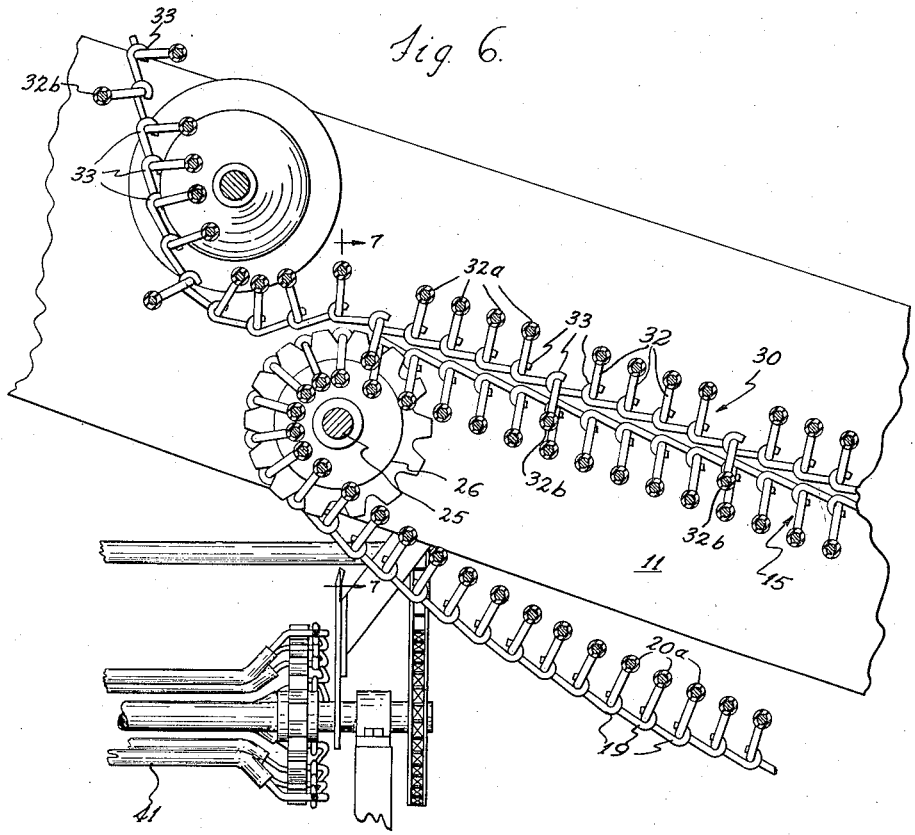
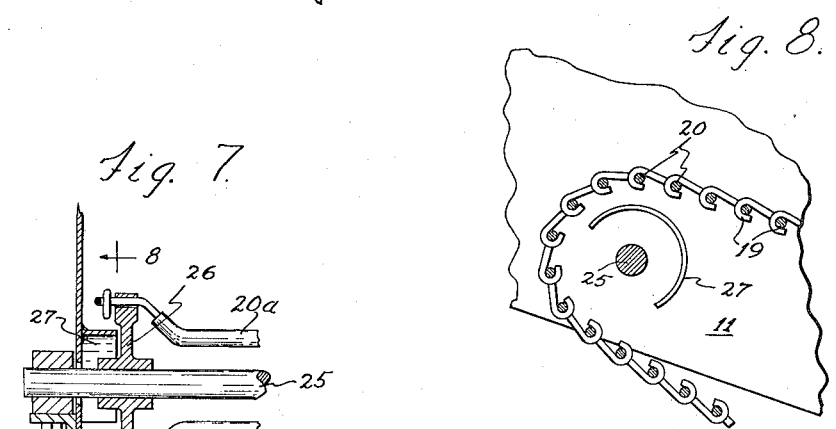
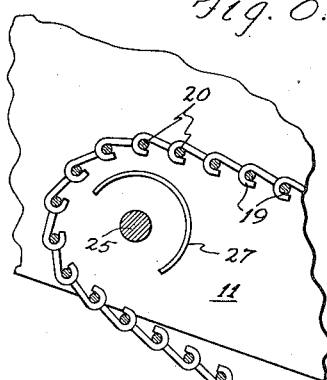
INVENTOR.
Carl E. Johnson
BY
Atty.

April 1, 1958  C. E. JOHNSON  2,828,825
POTATO HARVESTER CONVEYORS
Filed Dec. 6, 1954  5 Sheets-Sheet 5

INVENTOR.
Carl E. Johnson
BY *Truklwells*
Atty

United States Patent Office 2,828,825
Patented Apr. 1, 1958

2,828,825

POTATO HARVESTER CONVEYORS

Carl E. Johnson, Blackfoot, Idaho

Application December 6, 1954, Serial No. 473,121

11 Claims. (Cl. 171—118)

This invention relates to potato harvester conveyors. In the harvesting of potatoes, it is customary to use a machine wherein the potatoes are dug by a digger point which is drawn through the ground to penetrate at the proper depth to get beneath all of the potatoes. The digger point slopes upwardly and rearwardly at an angle of about twenty to thirty degrees to the horizontal and delivers the potatoes, soil and vines onto an elevating conveyor which has its lower end mounted at the rear end of the digger point. The upper end of the elevating conveyor passes over drive sprockets and the return flight of the conveyor is loose and passes, beneath the frame that carries the upper flight, forwardly to the digger point. The return flight is supported adjacent the front end by small roller guides which lift it high enough to keep it from dragging on the ground. The upper flight of the elevator conveyor is usually agitated by off center supports which are rotatably mounted on the frame. Some prior harvesters have used means such as a top draper conveyor over the elevator conveyor to aid in holding the potatoes on the elevator conveyor and to break up the colds, etc., which are carried with the potatoes. The conveyors commonly used in potato harvesters are made up of a multiplicity of cross rods which are bent at the ends to hook into each other. These rods are often covered with rubber tubing between the bent ends in order to protect the potatoes from bruising. The conveyors have been an expensive part of the harvesters because they wear out rapidly. The hard particles, such as gravel, etc., carried with the potatoes, get caught between the conveyor rods and the supports over which they travel and wear the rods out. Larger rocks sometimes get caught on the rollers and break the cross rods at the ends.

One of the difficult problems in potato harvesters of this character is to obtain proper separation and spreading of the load on the elevating conveyor so that separation of the soil from the potatoes may be accomplished. The digger point delivers all of the rather heavy load of dirt and potatoes onto the elevator conveyor and proper delivery of this load from the digger point onto the elevator conveyor is best accomplished by having the speed of the elevator conveyor at the point of delivery approximately equal to the ground speed of the digger point so that the load is picked up evenly as it passes from the digger point onto the conveyor. The load can be spread out on the elevator conveyor only by speeding it up with respect to the ground speed of the digger point. If this is done, however, difficulty occurs at the loading point, and the elevating speed of the potatoes is so great as to cause excessive throwing of the potatoes when they leave the elevator conveyor at the top end thereof. It is the principal purpose of the present invention to provide a novel elevator conveyor construction whereby the linear speed of the elevator conveyor between the point of receiving the load and the point of discharging the load is increased substantially beyond the loading and discharge speed so as to spread the load of potatoes, soil, etc.

It is also the purpose of the present invention to provide in combination with an elevator conveyor of the character above referred to, a top draper conveyor with a novel means for working the potatoes and soil on the elevator conveyor so as to obtain optimum separation of the potatoes from the soil and clods while they are on the elevator conveyor, together with a control means whereby the top draper conveyor can be operated at the proper speed with respect to the elevator conveyor to suit the particular type of soil and other conditions.

It is another purpose of my invention to provide an improved conveyor support bearing member for the ends of the conveyor cross rods which greatly lengthens the useful life of this type of conveyor, maintains alignment of the elevator conveyor and top draper conveyor, and, reduces clogging by rocks, vines, etc.

It is a further purpose of the invention to provide in combination with the elevator conveyor and the top draper conveyor, a raised flight on the top draper conveyor at the rear end whereby to prevent carrying over of the vines.

The nature and advantages and other specific objects of the invention will be apparent from the following description and the accompanying drawings illustrating a preferred form of the invention. It should be understood, however, that the drawings and description are illustrative only and are not intended to limit the invention except insofar as it is limited by the claims.

In the drawings:

Figure 3 is an enlarged fragmentary perspective view of the forward end of the harvester illustrating the structure where the potatoes are transferred to the elevating conveyor from the digger point;

Figure 4 is a sectional view of one of the conveyor bearing members looking in the direction of the arrows 4—4 of Figure 3;

Figure 5 is a fragmentary sectional view of one of the agitating sprockets which engage the elevator conveyor;

Figure 6 is an enlarged fragmentary sectional view through the harvester taken on the line 2—2 of Figure 1, illustrating the relationship of the elevating conveyor and the top draper conveyor;

Figure 7 is a fragmentary sectional view taken on the line 7—7 of Figure 6;

Figure 8 is a fragmentary sectional view taken on the line 8—8 of Figure 7;

Figure 1:
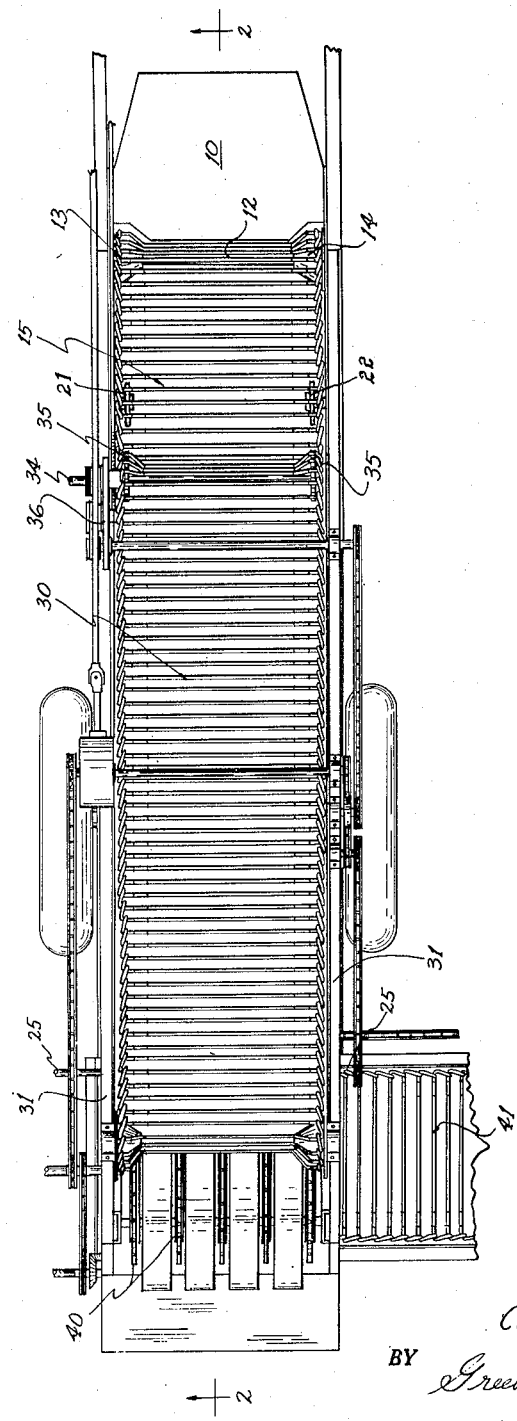
Figure 1 is a plan view of a potato harvester embodying my invention.
Figure 2:
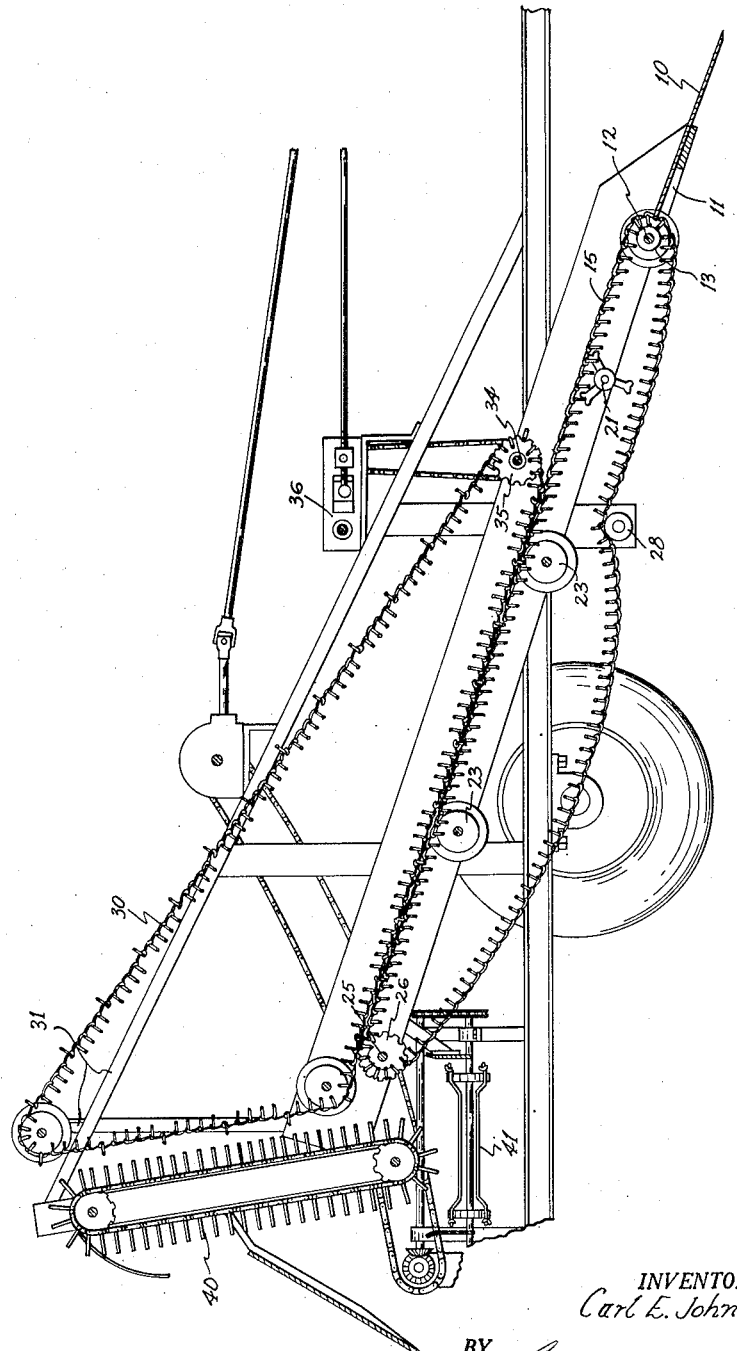
Figure 2 is a sectional view of the harvester taken on the line 2—2 of Figure 1.

Referring now to the drawings, the present invention is embodied in a machine wherein the digger point is identified by the numeral 10. This digger point is carried by a frame 11 which also mounts a cross shaft 12 at the rear end of the digger point. The cross shaft 12 supports two bearing members 13 and 14 for supporting and guiding an elevator conveyor 15. The bearing members 13 and 14 are alike so that one description will suffice for both. Each bearing member is provided with a cone shaped portion 16 and a flange 17 at the larger end of the portion 16. Spaced inwardly from the flange 17 there is an annular groove 18 in the cone shaped portion 16. The function of the groove is to receive the bent over hooks 19 which are provided at the ends of the cross rods 20 of the conveyor 15 for hooking each cross rod 20 into the next cross rod. The conveyor of my invention positions the free ends of the hooks 19 on the inside of the conveyor so that they will travel in the grooves of the members 13 and 14. These bearing members 13 and 14 are particularly important where the conveyor is carried upward from the lower flight to the upper flight and dirt, gravel, etc. is dropped from the upper flight. They keep the particles from lodging or catching between the cross rods and the bearing members and greatly prolong the useful life of the conveyor.

A short distance above the members 13 and 14 I provide agitating sprockets 21 and 22 which are carried by the frame 11 and which engage the cross rods 20 just inwardly of the bent over ends thereof so as to vibrate the elevating conveyor 15 after it receives the load. The conveyor 15 is supported at spaced intervals throughout its upper flight by bearing members 23 which are similar to the bearing members 13 and 14. At the upper end of the frame 11 a cross shaft 25 is provided. This shaft is power driven and carries sprockets 26 thereon for driving the conveyor 15. Immediately outward from each of the sprockets 26, I provide an inverted U-shaped metal guard 27 on the frame 11 (see Figures 7 and 8). These guards 27 are flat bands of metal and are extended inwardly into close proximity to the sprockets 26 so as to prevent any weeds or vines from wrapping around the shaft 25. Beneath the frame 11 near the front end thereof, I mount two supporting rollers 28 over which the conveyor 15 travels in order to keep the loose lower flight of the conveyor from dragging on the ground.

The principal feature of my invention is to provide means whereby the conveyor 15 will spread the load delivered to it by the digger point 10 so as to obtain better separation of the potatoes from the soil. I accomplish this result by a simple and very effective change in the construction of the conveyor 15. Each cross rod 20 of the conveyor 15 is extended inwardly a distance sufficient to ride over the sprocket wheels 26 in substantially a straight line from the point where it is encircled by the hook 19 of the next cross rod. The cross rod is then offset a substantial distance toward the inside of the conveyor, that is, toward the shaft 25. The amount of the offset is illustrated in the drawings as being between one third and one half of the radius about which the bearing member supported portion of the cross rod rotates. The offset portion 20a preferably is offset rearwardly with respect to a plane at right angles to the direction of movement of the conveyor 15 so as to drag slightly behind the ends of the cross rod. This offset is of the order of 15 degrees but it may be varied considerably and is not critical.

The inward offset of the cross links with respect to their driving portions results in a substantial slowing up of the intermediate offset portions 20a of the cross rod with respect to the ends thereof while each cross rod is going around the bearing members 13 and 14. The upper end of the digger point delivers its load to the offset portions 20a of the cross rods as they are rising and moving rearwardly. It is this portion of travel of the conveyor 15 that should be at the ground speed of the digger point to pick up the load smoothly. As soon as the conveyor 15 straightens out past the bearing members 13 and 14, the offset portions 20a of the cross rod 20 are spread apart farther to the same spacing as the end portions of the cross rods. This effects an immediate speed up or spread of the load on the conveyor 15 by an amount that depends upon the amount of offset of the portions 20a. See Figure 3 of the drawings.

By providing the conveyor 15 with the cross rods 20, having the offset portions 20a as described hereinbefore, I also accomplish the additional result of slowing down the travel of the potatoes at the time they leave the conveyor 15. It is believed to be evident from the description that has gone before that when the end portions of the cross rods 20 are travelling around the sprockets 26, the offset portions 20a will be travelling on a much smaller radius and will therefore travel at a substantially slower lineal speed. This results in slowing down the travel of the potatoes at the point where they leave the conveyor 15 so that the conveyor does not throw the potatoes. The offset portion 20a of each cross rod 20 is covered in the usual fashion with a rubber covering so as to minimize damage to the potatoes.

The offset portions 20a provide a trough-like cross section for the conveyor 15 so that the load on the conveyor will generally be confined to the offset portions 20a and the tendency of the material to ride outwardly on the ends of the cross rods 20 is avoided. The offset portions 20a also are utilized as an aid in clearing the conveyor 15 on its return flight. The return flight in passing over the rollers 28 have the portions 20a extending upwardly over the rollers so that these portions will spread apart and thus tend to discharge any trash on them.

Another feature of the present invention which cooperates with the elevator construction just described is the make-up of the top draper conveyor 30. This conveyor is carried upon the frame 11 and at its rear end it is extended upwardly and rearwardly above the frame 11 by upward extensions 31 on the frame 11. The top draper conveyor 30, like the conveyor 15, has its cross rods 32 provided with hooked portions 33 at the ends to hook over the next adjacent cross rod and these hook portions 33 hook inwardly as shown. The top draper conveyor 30 is driven by a drive shaft 34 and sprocket wheels 35 at its lower end. The drive shaft 34 is mounted in the frame 11 a substantial distance upwardly and rearwardly from the lower front end of the elevator conveyor 15 and rearwardly of the agitators 21. The flanges on the bearing members 23 are sufficiently large to guide the side edges of the top draper conveyor 30 as well as the conveyor 15. In constructing the cross rods 32, I provide a plurality of rods 32 with inwardly offset portions 32a. These inwardly offset portions 32a are separated in groups by cross rods 32 having outwardly offset portions 32b. The number of portions 32a from one portion 32b to another portion 32b lengthwise of the chain may be varied considerably. I find, however, for most purposes there should be from three to six of the portions 32a between each pair of the portions 32b.

The top draper conveyor 30 is driven at its lower front end as already described so that the top flight thereof is more taut and the bottom flight which lies over the elevator conveyor 15 is loose. I provide a variable drive mechanism 36 for the shaft 34 so that the top draper conveyor 30 can be driven at various speeds slower than the speed of the elevator conveyor 15. I have found that it is essential to always drive the top draper conveyor slower than the elevator conveyor 15 in order to utilize the weight of the top draper conveyor as a drag on the load that is carried by the conveyor 15 for working the soil and potatoes downwardly on the conveyor 15 and causing them to separate while they are being elevated. When the soil is heavy and difficult to separate from the potatoes, more difference in speed is necessary than when the soil is a light sandy soil that separates readily. The offset portions 32a and 32b of the cross rods 32 also incline rearwardly with respect to the direction of movement of the conveyor 30 as the offset portions of the conveyor 15 do. This makes the portions 32b more effective as a drag in separating the load on the conveyor 15. In actual practice the portions 32b set down in the trough provided by the offset portions 20a and actually provide barriers to separate the potatoes into groups.

When the potatoes are being discharged at the top of the elevator conveyor 15, the looseness of the top draper conveyor 30 permits it to droop over the upper end of the conveyor 15 slightly. This is also effective in preventing the throwing of the potatoes as they leave the conveyor 15 because the top draper conveyor 30 is always travelling slower than the conveyor 15. As an example of the relative speeds, it is not uncommon for the potato harvester to travel at a ground speed of 150 feet per minute. At this speed the particular construction of the elevator conveyor 15 and the draper conveyor 30 enables me to speed up the travel of the mid part of the conveyor 15 to around 240 feet per minute. The speed of the draper conveyor 30 is 60% to 80% of the speed of the conveyor 15.

The upper extending portion of the top draper conveyor 30 at the rear extends above the vine remover 40 which is spaced rearwardly from the rear end of the conveyor 15. This portion of the top draper conveyor 30 actually aids in keeping the vines in position to ride up on the vine remover 40 and be discharged while the potatoes remain on a cross conveyor 41 which carries them to a suitable loading device, not shown.

It is believed that the nature and advantages of my invention will be clear from the foregoing description. The operation and advantages may be briefly summarized as follows: By making the elevator conveyor 15 in the manner described, it is possible to receive the load of potatoes, soil and vines from the digger point at approximately the speed of the digger point and then to spread the load out as the cross rods separate to lessen the thickness of the load on any given length of conveyor. This lets the dirt, etc. fall through readily. This also makes it possible to deliver the potatoes with a minimum amount of throwing action and the least amount of drop onto another conveyor. Providing the top draper conveyor with a plurality of cross rods that are raised by offsetting the intermediate portions between other cross rods that are dropped down by offsetting the intermediate portions and by dragging the top draper conveyor, the load on the lower conveyor is shifted under the weight of the top draper conveyor so as to tend to drag back the potatoes and soil. These combined features which separate the potatoes into groups, tend to strip the vines from the potatoes and separate the soil that clings to the potatoes. They also break up clods because the clods are weighted down by the top draper conveyor and dragged against the rods of the lower conveyor. The bearing members 13, 14 and 23 guide the conveyors and keep them properly aligned from the time the load engages the lower conveyor until it is discharged. The grooves in the bearing members enable the hooked over portions of the cross rods in the lower conveyor to aid in holding the conveyors in proper position. The offsetting of the cross rods also provides a means to keep the potatoes from crowding to the side edges of the conveyor where they would be more apt to be seriously bruised. The construction is such that the tendency of the vines, grass and roots to become entangled with the conveyors or the drive mechanism is kept at a minimum.

Figure 9:
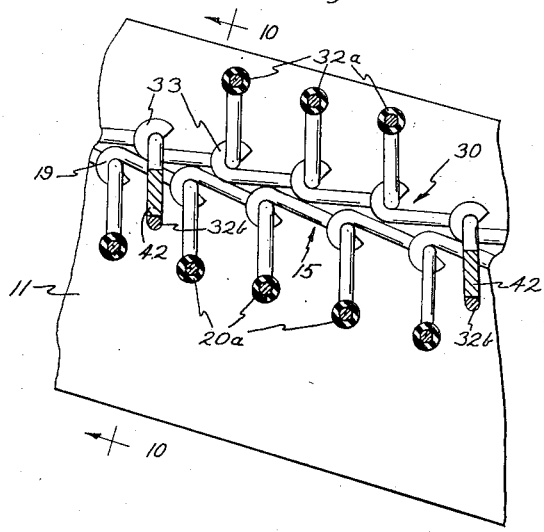
Figure 9 is an enlarged fragmentary sectional view taken on the same line as Figure 6, showing a modification of the top draper conveyor.
Figure 10:
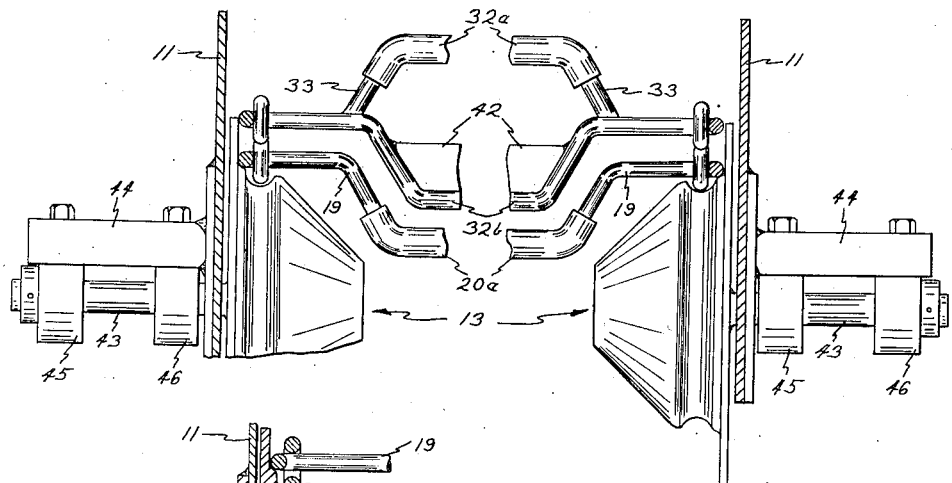
Figure 10 is a sectional view taken on the line 10—10 of Figure 9.

In the modification illustrated in Figures 9 and 10 the top draper conveyor 30 is given additional weight and made more effective as an aid to separating clods and dirt from the potatoes. In this modification the cross rods 32b have weight bars 42 secured to them. These bars extend upward where the conveyor 30 is riding on the conveyor 15 and thus act better to confine a body of potatoes, clods, etc. between them. The added weight of the bars 42 lessens the tendency of the cross rods 32b to ride over the material in the trough of the conveyor 15.

Figure 11:
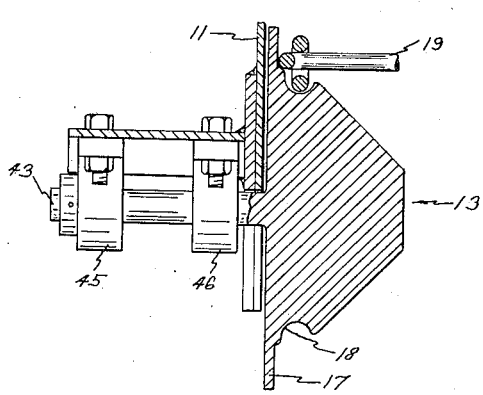
Figure 11 is a sectional view similar to Figure 4 illustrating a modification.

In Figure 11 the bearing members 13 are shown with a modified mounting on the side frame 11. With this mounting the cross shaft 12 is replaced by an individual stub shaft 43 for each bearing member. The stub shaft 43 is so mounted to the side frame 11 by a bracket 44 and bearings 45 and 46 that by loosening the bearings 45 and 46 from the bracket 44 the bearing member 13 with its bearings 45 and 46 can be dropped down and removed from the frame 11. The cross shaft 12 is eliminated with this construction.

The particular elevator conveyor construction of my invention is of great value in reducing wear on the conveyor parts. Actual experiences have demonstrated that conveyors so constructed last more than twice as long as those without this particular offset cross rod portions 20a and the bearing members 13 and 14. In conditions where the former conveyors would harvest about 50 acres of potatoes before beginning to break my improved conveyors have remained unbroken after harvesting more than 100 acres of potatoes. The offset 20a gives a considerable mechanical advantage where the load of potatoes and dirt is being lifted from the digger 10 on to the conveyor 15. While the end of each cross rod 20 is being raised a distance to go over the bearing members 13, 14 and 26 the portion 20a, carrying the load, is lifted only a fraction of this distance. This lessens the strain and reduces the wear on the rods. The inturned hooks 19 riding in the grooves 18 saves the rods too so that they are worn mostly by the sprockets 26. Much of the dirt load is lost immediately when the portions 20a spread apart.

Having thus described my invention, I claim:

1. A conveyor adapted for conveying away and elevating potatoes from a delivery point of a potato harvester comprising an endless conveyor member, a supporting frame therefor having front and rear rotatable supports about which the endless conveyor extends to pass in juxtaposition to the delivery point to receive potatoes, soil, etc., said endless conveyor comprising cross rods spaced apart lengthwise of the conveyor, said rods having straight parallel load receiving portions intermediate their ends, each rod having short portions at their ends bent to extend lengthwise of the conveyor riding on the rotatable support and linked to the adjacent rods, the rods each having bends therein adjacent to the ends thereof offsetting the portions of said rods which ride on the rotatable supports outwardly from the portions of the rods between the bends, so that, in passing around said supports, the portions of the rods riding on the supports travel substantially faster than the portions of the rods between the bends therein.

2. In a potato harvesting machine, an endless conveyor for elevating and conveying potatoes rearwardly away from a delivery point, a supporting frame, front rotatable supports journalled on the frame adjacent the delivery point about which the conveyor extends to pass in juxtaposition to the delivery point to receive potatoes, soil, etc., rear drive sprockets at the rear of the frame to drive the conveyor, intermediate rotatable supports for the conveyor on the frame between the sprockets and the front rotatable supports, said conveyor comprising spaced apart cross rods having straight parallel load receiving portions intermediate their ends, each rod having short portions at their ends bent to extend lengthwise of the conveyor linked to adjacent rods, the rods each having bends therein adjacent to the ends thereof offsetting the portions of the rods riding on the rotatable supports outwardly from the portions of the rods between the bends, so that, in passing around said supports, the portions of the rods riding on said supports travel substantially faster than the portions of the rods between the bends therein, a top draper conveyor positioned above said first named conveyor, rotatable supports on the frame about which said top draper conveyor extends, said top draper conveyor having a portion thereof positioned in close proximity to said first named conveyor, means to rotate said top draper conveyor so that the portion thereof in proximity to the first named conveyor travels in the same direction as said first named conveyor, said top draper conveyor comprising spaced apart cross rods each having its end portions linked to an adjacent rod, the end portions of said rods riding on the rotatable supports, certain of said cross rods having bends therein adjacent to the end portions thereof offsetting the end portions riding on the rotatable supports inwardly from the portions of the rods between the bends therein.

3. In a potato harvesting machine, an endless conveyor for elevating and conveying potatoes away from a delivery point, a supporting frame, front rotatable supports journalled on the frame adjacent the delivery point about which the conveyor extends to pass in juxtaposition to the delivery point to receive potatoes, soil, etc., drive sprockets at the rear of the supporting frame to drive the conveyor, intermediate rotatable supports for the conveyor on the frame between the sprocket and the front rotatable supports, said conveyor comprising spaced apart cross rods having straight parallel load receiving portions intermediate their ends, each rod having short portions at their ends bent to extend lengthwise of the conveyor linked to adjacent rods, the rods each having bends therein adjacent to the ends thereof offsetting the portions of the rods riding on the rotatable supports outwardly from the portions of the rods between the bends, so that, in passing around said supports, the portions of the rods riding on said supports travel substantially faster than the portions of the rods between the bends therein, a top draper conveyor positioned above said first named conveyor, rotatable supports on the frame about which said top draper conveyor extends, said top draper conveyor having a portion thereof positioned in close proximity to said first named conveyor, means to rotate said top draper conveyor so that the portion thereof in proximity to the first named conveyor rides upon and travels in the same direction as said first named conveyor at a speed substantially slower than the first named conveyor, said top draper conveyor comprising spaced apart cross rods each having its end portions linked to an adjacent rod, said end portions riding on the rotatable supports, certain of said cross rods having bends therein adjacent to the ends thereof offsetting the end portions riding on the rotatable supports inwardly from the portions of the rods between the bends therein.

4. A conveyor adapted for conveying away and elevating dug potatoes, comprising a supporting frame, an endless conveyor, rotatable end supports for the conveyor mounted in said frame and carrying the endless conveyor, said supports including conveyor drive sprockets, the endless conveyor comprising spaced apart straight parallel load bearing cross rods, the ends of the cross rods being connected to each other by connecting means that are offset outwardly from the cross rods and which ride on the rotatable supports, so that, in passing around said supports, the connecting means which ride on the supports travel substantially faster than the load bearing cross rods.

5. A conveyor adapted for conveying away and elevating dug potatoes, comprising a supporting frame, an endless conveyor, rotatable end supports for the conveyor mounted in said frame and carrying the endless conveyor, said supports including conveyor drive sprockets, the endless conveyor comprising spaced apart straight parallel load bearing cross rods, the ends of the cross rods being connected to each other by connecting means that are offset outwardly from the cross rods and which ride on the rotatable supports, so that, in passing around said supports, the connecting means which ride on the supports travel substantially faster than the load bearing cross rods, said connecting means comprising outwardly offset end portions on each rod, that are bent to extend over the next rod and then inward to form a hook about said next rod.

6. A conveyor mechanism adapted for conveying away and elevating dug potatoes, comprising a supporting frame, an endless conveyor, rotatable end supports for the conveyor mounted in said frame and carrying the endless conveyor, said supports including conveyor drive sprockets, the endless conveyor comprising spaced apart straight parallel load bearing cross rods, the ends of the cross rods being connected to each other by connecting means that are offset outwardly from the cross rods and which ride on the rotatable supports, so that, in passing around said supports, the connecting means which ride on the supports travel substantially faster than the load bearing cross rods, said connecting means comprising outwardly offset end portions on each rod, that are bent to extend over the next rod and then inward to form a hook about each next rod, the rotatable supports for said conveyor at its receiving and comprising two cone-shaped bearing members, and having an annular groove spaced from the larger ends thereof to receive the hook.

7. A conveyor mechanism adapted for conveying away and elevating dug potatoes, comprising a supporting frame, an endless conveyor, rotatable end supports for the conveyor mounted in said frame and carrying the endless conveyor, the endless conveyor comprising spaced apart cross rods having their ends linked to adjacent rods and having straight parallel load bearing portions between the ends offset inwardly from the end portions, the rods each having bends therein adjacent to the ends thereof, offsetting the portions of said rods between the bends inwardly from the linked together ends, so that, in passing around said supports, the linked together ends travel substantially faster than the inwardly offset portions thereof.

8. A conveyor mechanism adapted for conveying away and elevating dug potatoes, comprising a supporting frame, an endless conveyor, rotatable end supports for the conveyor mounted in said frame and carrying the endless conveyor, the endless conveyor comprising spaced apart cross rods having their ends linked to adjacent rods, a top draper conveyor positioned above and in close proximity to said first named conveyor, rotatable supports on the frame about which the top conveyor extends, said top conveyor comprising spaced apart cross rods having their ends linked together, certain groups of rods in said top conveyor having bends therein adjacent to the ends thereof offsetting inwardly the portions of the rods between the bends in each group, there being a rod between each of said groups which does not have the inwardly offset portion between its ends, said top conveyor having its lower flight slack thereby to drag on the material carried by the first named conveyor.

9. A conveyor mechanism adapted for conveying away and elevating dug potatoes, comprising a supporting frame, an endless conveyor, rotatable end supports for the conveyor mounted in said frame and carrying the endless conveyor, the endless conveyor comprising spaced apart cross rods having their ends linked to adjacent rods, a top draper conveyor positioned above and in close proximiity to said first named conveyor, rotatable supports on the frame about which the top conveyor extends, said top conveyor comprising spaced apart cross rods having their ends linked together, certain groups of rods in said upper conveyor having bends therein adjacent to the ends thereof offsetting inwardly the portions of the rods between the bends in each group, there being a rod between each of said groups which does not have the inwardly offset portion between its ends, said top conveyor having its lower flight slack whereby to drag on the material carried by the first named conveyor, and means to vary the speed of said top conveyor with respect to that of the first named conveyor.

10. In an endless conveyor adapted for conveying away potatoes, etc. from a loading point where the potatoes, etc. are crowded onto the conveyor as it rises around a rotatable end support, means to spread the crowded load as the conveyor leaves said support comprising cross rods linked together at their ends to form the conveyor, the ends riding on said rotatable supports, the rods being bent inward adjacent their ends and being straight between the points where they are bent to provide a flat load receiving portion between the ends, which portion is offset inwardly toward the axis of the rotatable supports from the linked together ends.

11. A conveyor mechanism adapted for conveying away and elevating dug potatoes, comprising a supporting frame, an endless conveyor, rotatable end supports for the conveyor mounted in said frame and carrying the endless conveyor, the endless conveyor comprising spaced apart cross rods having their ends linked to adjacent rods, said rotatable end supports at the end of the conveyor where the cross rods travel upward comprising cone-shaped bearing members, said bearing members having annular grooves adjacent to their largest ends and each cross rod having its ends hooked over the next adjacent rod and turned in to ride in said grooves, and said bearing members having end flanges adjacent to said grooves to confine the cross rods.

References Cited in the file of this patent

UNITED STATES PATENTS

| | | |
|---|---|---|
| 990,726 | Gettman | Apr. 25, 1911 |
| 1,646,452 | Gronke | Oct. 25, 1927 |
| 2,171,779 | Young | Sept. 5, 1939 |
| 2,287,367 | Albin | June 23, 1942 |
| 2,468,639 | Sample | Apr. 26, 1949 |
| 2,717,071 | Cook | Sept. 6, 1955 |